United States Patent
Johnson

(10) Patent No.: US 10,127,265 B2
(45) Date of Patent: Nov. 13, 2018

(54) SYSTEMS AND METHODS FOR MEASUREMENT EQUIVALENCY

(71) Applicant: SCHNEIDER ELECTRIC USA, INC., Palatine, IL (US)

(72) Inventor: Jeffrey Wayne Johnson, Victoria (CA)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 119 days.

(21) Appl. No.: 14/909,312

(22) PCT Filed: Aug. 2, 2013

(86) PCT No.: PCT/US2013/053487
§ 371 (c)(1),
(2) Date: Feb. 1, 2016

(87) PCT Pub. No.: WO2015/016949
PCT Pub. Date: Feb. 5, 2015

(65) Prior Publication Data
US 2016/0179870 A1    Jun. 23, 2016

(51) Int. Cl.
*G06F 17/30* (2006.01)
*G06F 1/26* (2006.01)
(Continued)

(52) U.S. Cl.
CPC .......... *G06F 17/30371* (2013.01); *G06F 1/26* (2013.01); *G06F 1/3209* (2013.01); *G06Q 50/06* (2013.01)

(58) Field of Classification Search
None
See application file for complete search history.

(56) References Cited

U.S. PATENT DOCUMENTS

| 6,828,771 B1 | 12/2004 | Ghassemi |
| 2012/0054342 A1 | 3/2012 | Buco et al. |

(Continued)

FOREIGN PATENT DOCUMENTS

| EP | 2533467 A1 | 12/2012 |
| WO | 2011/092381 A1 | 8/2011 |

OTHER PUBLICATIONS

Notification of Transmittal of the International Search Report and Written Opinon of the International Searching Authority from corresponding PCT/US2013/053487 dated Jan. 16, 2014.

*Primary Examiner* — Reema Patel
*Assistant Examiner* — Steven Christopher
(74) *Attorney, Agent, or Firm* — Lando & Anastasi, LLP

(57) ABSTRACT

According to one aspect, a system configured to provide equivalent measurement values is provided. The measurement equivalency component is configured to receive, from a component, data requesting at least one measurement value meeting at least one criterion, the at least one measurement value having at least one first measurement type, determine that the at least one measurement value is not stored within at least one memory, determine that at least one stored measurement value meeting the at least one criterion and having at least one second measurement type different from the at least one first measurement type is stored within the at least one memory, and provide data descriptive of at least one equivalent measurement value based on the at least one stored measurement value to the component in response to receipt of the data requesting the at least one measurement value.

20 Claims, 6 Drawing Sheets

(51) Int. Cl.
*G06F 1/32* (2006.01)
*G06Q 50/06* (2012.01)

(56) References Cited

U.S. PATENT DOCUMENTS

2012/0095694 A1    4/2012   Gopalan
2013/0111250 A1    5/2013   Yang et al.
2013/0290282 A1* 10/2013   Faerber ............. G06F 17/30153
                                                                                707/693
2013/0339777 A1* 12/2013   Varma ....................... G06F 1/26
                                                                                713/340

* cited by examiner

SYSTEMS AND METHODS FOR MEASUREMENT EQUIVALENCY

CROSS-REFERENCE TO RELATED APPLICATIONS

This application is a U.S. National Stage Application under 35 U.S.C. § 371 of International Application No. PCT/US2013/053487, filed Aug. 2, 2013, titled SYSTEMS AND METHODS FOR MEASUREMENT EQUIVALENCY, which is hereby incorporated herein by reference in its entirety.

BACKGROUND

Technical Field

The technical field relates generally to measurement equivalency for power monitoring data, and more particularly, to systems and methods for determining measurement equivalency for power monitoring data.

Background Discussion

Devices which generate, consume, and deliver power are implemented with various measurement capabilities. These devices may monitor and report various measurements to a central location. Data models are commonly used to describe the measurements of these devices, regardless of the types of device and available measurement capabilities. Data models provide end-users and systems with a level of abstraction which enables software to perform queries against a consistent model.

For example, in a particular data center, meters, uninterruptable power supplies (UPSs) and Power Distribution Units (PDUs) may perform various power-related measurements. Each device may be manufactured with different measurement types available. For example, a simple device may measure one or more types of unidirectional power flow while a more sophisticated device may measure bidirectional power flow. To effectively monitor a data center, the data center personnel must be aware of the differences in available measurement types for each device.

SUMMARY

According to one aspect, a system configured to provide equivalent measurement values is provided. The system comprises at least one memory, at least one processor coupled to the at least one memory, a component executable by the at least one processor, and a measurement equivalency component executable by the at least one processor. The measurement equivalency component is configured to receive, from the component, data requesting at least one measurement value meeting at least one criterion, the at least one measurement value having at least one first measurement type, determine that the at least one measurement value is not stored within the at least one memory, determine that at least one stored measurement value meeting the at least one criterion and having at least one second measurement type different from the at least one first measurement type is stored within the at least one memory, and provide data descriptive of at least one equivalent measurement value based on the at least one stored measurement value to the component in response to receipt of the data requesting the at least one measurement value.

According to one embodiment, the measurement equivalency component is configured to receive the data by receiving data requesting at least one measurement value from an identified device recorded within an identified period of time. According to one embodiment, the at least one measurement value includes a plurality of measurement values. In this embodiment, the measurement equivalency component is configured to determine that the at least one measurement value is not stored within the at least one memory by determining that one or more measurement values of the plurality of measurement values are not stored within the at least one memory, determine that one or more other measurement values of the plurality of measurement values are stored within the at least one memory, determine that the at least one stored measurement value meeting the at least one criterion and having the at least one second measurement type different from the at least one measurement type is stored within the at least one memory by identifying one or more stored measurement values meeting the at least one criterion, having the at least one second measurement type, and corresponding to the one or more measurement values, and providing data describing the at least one equivalent measurement value by providing the one or more stored measurement values and the one or more other measurement values.

According to one embodiment, the measurement equivalency component is configured to determine that the at least one stored measurement value meeting the at least one criterion and having the at least one second measurement type different from the at least one first measurement type is stored within the at least one memory by identifying at least one measurement class including the at least one first measurement type and identifying the at least one second measurement type as belonging to the at least one measurement class. According to one embodiment, the measurement equivalency component is further configured to determine that the at least one stored measurement value meeting the at least one criterion and having the at least one second measurement type different from the at least one first measurement type is stored within the at least one memory by determining that the at least one second measurement type has a priority higher than a priority of at least one third measurement type belonging to the at least one measurement class. According to one embodiment, the measurement equivalency component is further configured to determine that the at least one stored measurement value meeting the at least one criterion and having the at least one second measurement type different from the at least one first measurement type is stored within the at least one memory by identifying at least one equivalency validation component configured to determine whether a predefined condition exists; and executing the at least one equivalency validation component.

According to one embodiment, the measurement equivalency component is configured to provide the data describing the at least one equivalent measurement value by identifying at least one equivalency calculation component configured to calculate the at least one equivalent measurement value and executing the at least one equivalency calculation component.

According to one aspect, a method of providing equivalent measurement values using a computer system including at least one memory and at least one processor coupled to the at least one memory is provided. The method comprises receiving, from a component executed by the at least one processor, data requesting at least one measurement value meeting at least one criterion, the at least one measurement value having at least one first measurement type, determining that the at least one measurement value is not stored within the at least one memory, determining that at least one stored measurement value meeting the at least one criterion and having at least one second measurement type different from the at least one first measurement type is stored within the at least one memory, and providing data describing at least one equivalent measurement value based on the at least one stored measurement value to the component in response to receiving the data requesting the at least one measurement value.

According to one embodiment, receiving the data includes receiving data requesting at least one measurement value from an identified device recorded within an identified period of time. According to one embodiment, the at least one measurement value includes a plurality of measurement values, determining that the at least one measurement value is not stored within the at least one memory includes determining that one or more measurement values of the plurality of measurement values are not stored within the at least one memory, determining that one or more other measurement values of the plurality of measurement values are stored within the at least one memory, determining that the at least one stored measurement value meeting the at least one criterion and having the at least one second measurement type different from the at least one measurement type is stored within the at least one memory includes identifying one or more stored measurement values meeting the at least one criterion, having the at least one second measurement type, and corresponding to the one or more measurement values, and providing data describing the at least one equivalent measurement value includes providing the one or more stored measurement values and the one or more other measurement values.

According to one embodiment, determining that the at least one stored measurement value meeting the at least one criterion and having the at least one second measurement type different from the at least one first measurement type is stored within the at least one memory includes identifying at least one measurement class including the at least one first measurement type, and identifying the at least one second measurement type as belonging to the at least one measurement class. According to one embodiment, determining that the at least one stored measurement value meeting the at least one criterion and having the at least one second measurement type different from the at least one first measurement type is stored within the at least one memory further includes determining that the at least one second measurement type has a priority higher than a priority of at least one third measurement type belonging to the at least one measurement class.

According to one embodiment, determining that the at least one stored measurement value meeting the at least one criterion and having the at least one second measurement type different from the at least one first measurement type is stored within the at least one memory further includes identifying at least one equivalency validation component configured to determine whether a predefined condition exists, and executing the at least one equivalency validation component.

According to one embodiment, providing the data describing the at least one equivalent measurement value includes identifying at least one equivalency calculation component configured to calculate the at least one equivalent measurement value, and executing the at least one equivalency calculation component.

According to one aspect, a non-transitory computer readable medium storing sequences of instructions executable by at least one processor, the sequences of instructions instructing the at least one processor to execute a process of providing equivalent measurement values, is provided. The sequences of instructions include instructions to receive, from a component executed by the at least one processor, data requesting at least one measurement value meeting at least one criterion, the at least one measurement value having at least one first measurement type, determine that the at least one measurement value is not stored within the at least one memory, determine that at least one stored measurement value meeting the at least one criterion and having at least one second measurement type different from the at least one first measurement type is stored within the at least one memory, and provide data descriptive of at least one equivalent measurement value based on the at least one stored measurement value to the component in response to receipt of the data requesting the at least one measurement value.

According to one embodiment, the instructions are configured to receive the data by receiving data requesting at least one measurement value from an identified device recorded within an identified period of time. According to one embodiment, the at least one measurement value includes a plurality of measurement values and the instructions are configured to determine that the at least one measurement value is not stored within the at least one memory by determining that one or more measurement values of the plurality of measurement values are not stored within the at least one memory, determine that one or more other measurement values of the plurality of measurement values are stored within the at least one memory, determine that the at least one stored measurement value meeting the at least one criterion and having the at least one second measurement type different from the at least one measurement type is stored within the at least one memory by identifying one or more stored measurement values meeting the at least one criterion, having the at least one second measurement type, and corresponding to the one or more measurement values, and providing data describing the at least one equivalent measurement value by providing the one or more stored measurement values and the one or more other measurement values.

According to one embodiment, the instructions are configured to determine that the at least one stored measurement value meeting the at least one criterion and having the at least one second measurement type different from the at least one first measurement type is stored within the at least one memory by identifying at least one measurement class including the at least one first measurement type and identifying the at least one second measurement type as belonging to the at least one measurement class. According to one embodiment, the instructions are further configured to determine that the at least one stored measurement value meeting the at least one criterion and having the at least one second measurement type different from the at least one first measurement type is stored within the at least one memory by determining that the at least one second measurement type has a priority higher than a priority of at least one third measurement type belonging to the at least one measurement class. According to one embodiment, the instructions are further configured to determine that the at least one stored measurement value meeting the at least one criterion and having the at least one second measurement type different from the at least one first measurement type is stored within the at least one memory by identifying at least one equivalency validation component configured to determine whether a predefined condition exists; and executing the at least one equivalency validation component.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed subject matter. Particular references to examples and embodiments, such as "an embodiment," "an other embodiment," "some embodiments," "other embodiments," "an alternate embodiment," "various embodiments," "one embodiment," "at least one embodiments," "this and other embodiments" or the like, are not necessarily mutually exclusive and are intended to indicate that a particular feature, structure, or characteristic described in connection with the embodiment or example and may be included in that embodiment or example and other embodiments or examples. The appearances of such terms herein are not necessarily all referring to the same embodiment or example.

Furthermore, in the event of inconsistent usages of terms between this document and documents incorporated herein by reference, the term usage in the incorporated references is supplementary to that of this document; for irreconcilable inconsistencies, the term usage in this document controls. In addition, the accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
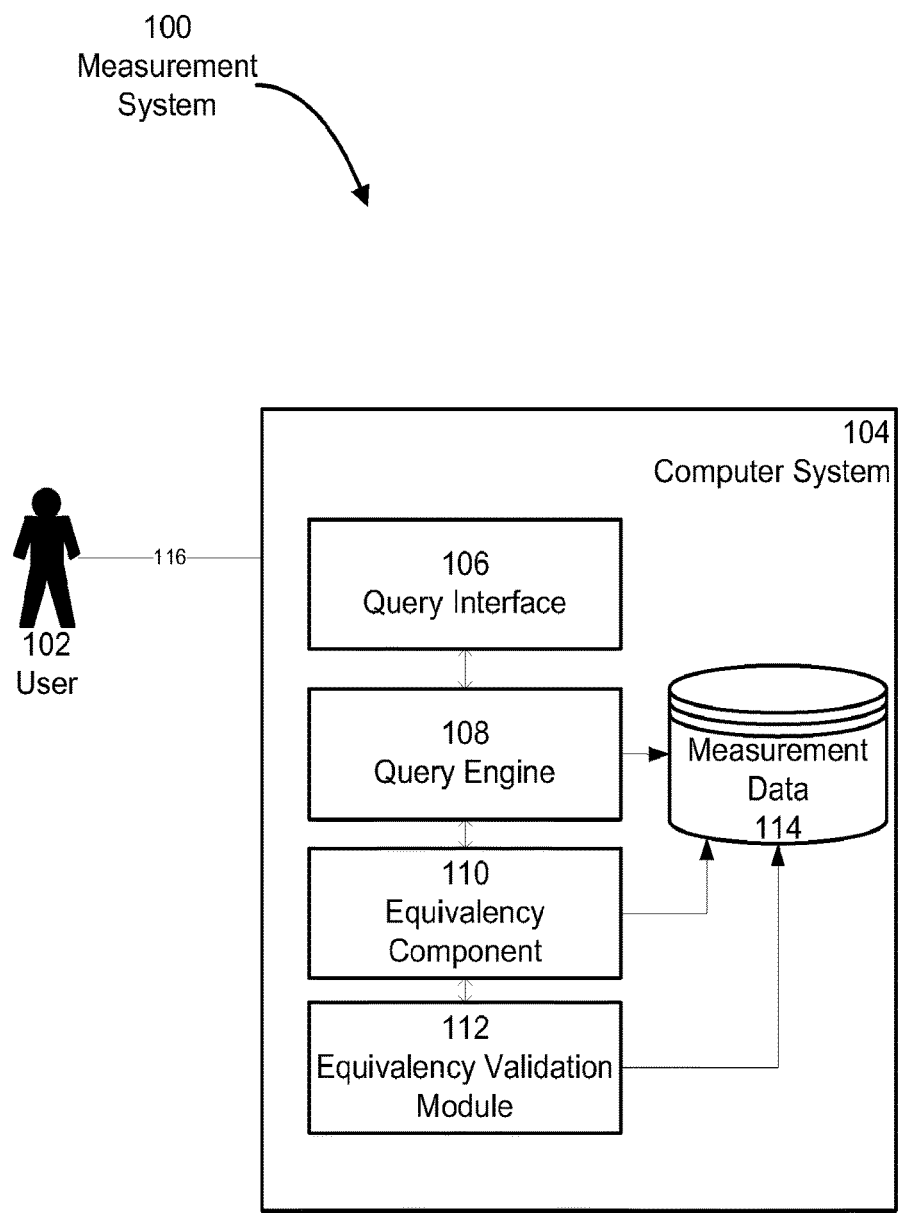
FIG. 1 is a block diagram including an example system for measurement equivalency.

Some embodiments disclosed herein include systems and methods for determining measurement value equivalency across multiple devices with divergent measurement types.

According to various embodiments, equivalency of measurement values may be based on configurable relationships between measurement types. In these embodiments, equivalency relationships may be defined in configuration data (e.g., configuration files) or generated during application run-time. For instance, measurement types may be associated with equivalency classes based on equivalency relationships defined in a table, or other data structure, associating one or more measurement types with equivalency classes. These equivalency relationships may be based on equivalency priorities, and logical conditions.

In various embodiments, measurements and quantities may be defined by one or more data models which provide a consistent model with which processes described herein may query data. In these embodiments, measurement values may be contained in one or more data repositories and catalogued with various other properties. A non-limiting list of characteristics may include a device identifier, a physical sensor identifier, a logical device identifier (i.e., logical grouping of device/physical sensor identifiers), a data model identifier, and timestamps.

In at least one embodiment, measurement values are received from one or more devices, such as the programmable device 500 discussed below with reference to FIG. 5. One or more sensors, such as sensor 506 (FIG. 5) may determine one or more measurement values which are stored in one or more measurement data repositories.

In at least one embodiment, one data repository may be a supervisory and data acquisition (SCADA) distributed database which includes additional characteristics such as tags or points representing a single input or output value monitored or controlled by a device, such as the programmable device 500 discussed below with reference to FIG. 5. In this embodiment, tags are normally stored as value-timestamp pairs: a value, and the timestamp when it was recorded or calculated. A series of these value-timestamp pairs comprises a history for the single input or output.

In various other embodiments of the present disclosure, methods and systems for querying the measurement data repositories to determine equivalent measurements is provided. In one embodiment, a query engine may receive a query generated by a user/process to report and/or analyze measurements for one or more devices. In this embodiment, the query engine may provide the query to an equivalency component, which in combination with the measurement data repository, intelligently determines equivalent measurement values when a requested measurement type is unavailable. In another embodiment, the query engine may directly implement the equivalency component and transparently determine equivalent measurements. In one embodiment, an equivalency component determines equivalent measurements by dynamically loading equivalency validation modules to conditionally determine equivalent measurement values. In this embodiment, the equivalency component may use one or more defined priorities when determining equivalent measurement values. In another embodiment, an equivalency component may transform an equivalent measurement value before substituting the value for the requested measurement value. In this embodiment, the transformation may be performed by a dynamically loaded module. For instance, an equivalent measurement value may be scaled to the same unit of energy of a requested measurement type.

Examples of the methods and systems discussed herein are not limited in application to the details of construction and the arrangement of components set forth in the following description or illustrated in the accompanying drawings.

The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Measurement Data Equivalency Component

Some embodiments disclosed herein implement a measurement equivalency component using one or more computer systems, such as the computer system 602 described below with reference to FIG. 6. According to these embodiments, the measurement equivalency component may accept requests for one or more measurement values. The request may specify at least one measurement value having a particular measurement type, and one or more associated characteristics of the measurement values as criterion. In some embodiments, a request may specify other measurement identifiers, in addition to one or more criterion, and may include, for example, a measurement type, such as 3400115 Active Energy Total Interval from Table 1 described below. In other embodiments, a request may specify a measurement equivalency class, such as 1050 Apparent Power from Table 1 described below. In still other embodiments, a unit value (e.g., kWh) may be specified in a request. It should be understood that any number of measurement identifiers (e.g., measurement type, equivalency class, measurement values, unit value, etc.) may be included in one or more combinations in a request.

In at least one embodiment, a requested measurement may not be available, or may not be fully available, given the criterion. For example, if the criterion includes a time-range for a measurement type, a complete series of measurement values may not be available for the given measurement type over the full time-range. In this example, the measurement equivalency component may determine one or more additional measurement types which are equivalent, and provide an aggregated result based on the available measurement values of the requested measurement type and one or more equivalent measurement values. Examples of this determination may be found further below with reference to the processes 200-400 of FIGS. 2-4.

FIG. 1 illustrates an example measurement system generally designated at 100. As shown, FIG. 1 includes a user 102, a network 116, and a computer system 104. According to various examples, the measurement system 100 is implemented using a computer system, such as the computer system 602 discussed below with reference to FIG. 6. In these examples, the user 102 may access the measurement system 100 using the network 116 (e.g., via a smart phone or other computer system using an application or web-based interface) or may directly access the scheduling system 100. Thus, examples of the measurement system 100 include a variety of hardware and software components configured to perform the functions described herein and examples are not limited to a particular hardware component, software component, or particular combination thereof. The network 116 may include any communication network through which computer systems (i.e. send or receive) information. For example, the network 116 may be a public network, such as the internet, and may include other public or private networks such as LANs, WANs, extranets and internets. As shown, the user 102 may utilize the network 116 to exchange data with the measurement system 100. For example, the user 102 may access the measurement system 100 using the network 116 from a remote computer system or from a mobile device such as a laptop or smart phone.

In addition, information may flow between the elements, components and subsystems described herein using a variety of techniques. Such techniques include, for example, passing the information over the network 116 using standard protocols, such as TCP/IP, passing the information between modules in memory and passing the information by writing to a file, database, or some other non-volatile storage device. In addition, pointers, identifiers, or other references to information may be transmitted and received in place of, or in addition to, copies of the information. Conversely, the information may be exchanged in place of, or in addition to, pointers, identifiers, or other references to the information. Other techniques and protocols for communicating information may be used without departing from the scope of the examples disclosed herein.

In the illustrated example, the computer system 104 includes a query interface 106, a query engine 108, an equivalency component 110, an equivalency validation module 112, and a measurement data repository 114. As discussed above, information may flow between the components (i.e. components 106-114) in various ways. For example, the query engine 108, the equivalency component 110, and the equivalency validation module 112 may interact directly and/or indirectly with the measurement data repository 114 to determine if requested measurement identifiers have no corresponding measurement values available.

The query interface 106 enables a process executed by a processor of the computer system 104, or the user 116, to construct and/or receive a query for measurement values. For example, the query interface may be a combination of visual components presented in a user interface, such as a user interface described below with regard to FIG. 6. In these examples, a user may generate a query by inputting one or more criterion in the user interface. In another example, the query may be generated and/or received via an application programming interface (API). In this example, the API may enable the generation of a query via one or more method calls (e.g., from the network 116, or from a process on the computer system 104). Once a query has been received, the query interface 106 may pass the query to the query engine 108.

The query engine 108 processes the query generated by the query interface 106. A query may identify at least one measurement identifier (e.g., measurement value, measurement type, equivalency class, etc.) and one or more criterion. Criterion may include any characteristic related to stored measurement values and may include one or more device identifiers, one or more physical sensor identifiers, one or more logical device identifiers, one or more data model identifiers, and one or more time ranges. The query may also include one or more logical propositions. The logical proposition may be, for example, a logical implication. The logical proposition may include one or more logical operators. A non-limiting list of the logical operators that may be used in these logical propositions includes "and", "or", "xor" and "andnot." The logical propositions may include other operators as well. For example, in one embodiment comparison operators, such as "<", ">" and "=" may be used. In still another embodiment, a priority operator may be used that will prevent equivalent measurements from being used if the equivalent measurement type is above a certain equivalency priority level. As will be discussed further below, and also in regard to FIG. 4, equivalency priorities define the priority of which equivalent measurement to use if a requested measurement type is unavailable.

In at least one embodiment, the requested measurement type may be associated with other equivalent measurement types based on predefined relationships. In at least one embodiment, equivalency relationships are defined in configuration data, such as a configuration file, a lookup table, or other data structure.

Table 1 shows an example measurement equivalency table that includes multiple equivalency classes.

not intended to be limiting and may include other measurement types. For example, while the measurement types listed in Table 1 are denoted in Kilowatt-hour (kWh) other measurement types may include other quantities.

In one embodiment, the measurement types may be grouped into an equivalency class and have a defined equivalency priority and logical condition. Table 2 shows an example measurement equivalency class table that may be included in the configuration data.

TABLE 2

Figure 2:
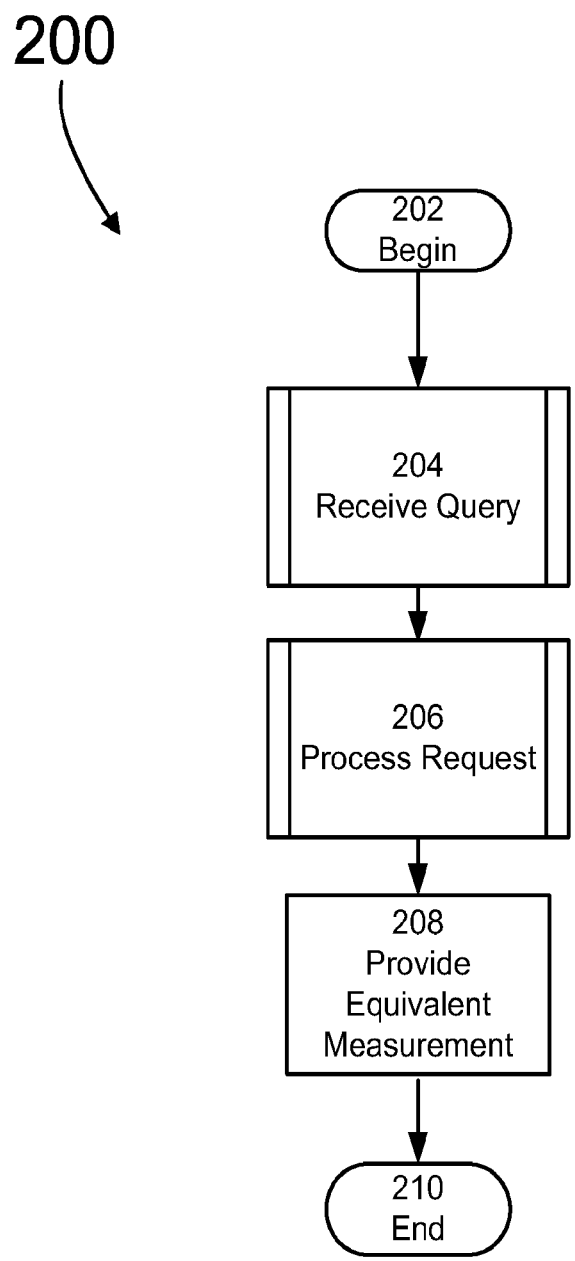
FIG. 2 is a flow diagram of an example measurement equivalency process.
Figure 3:
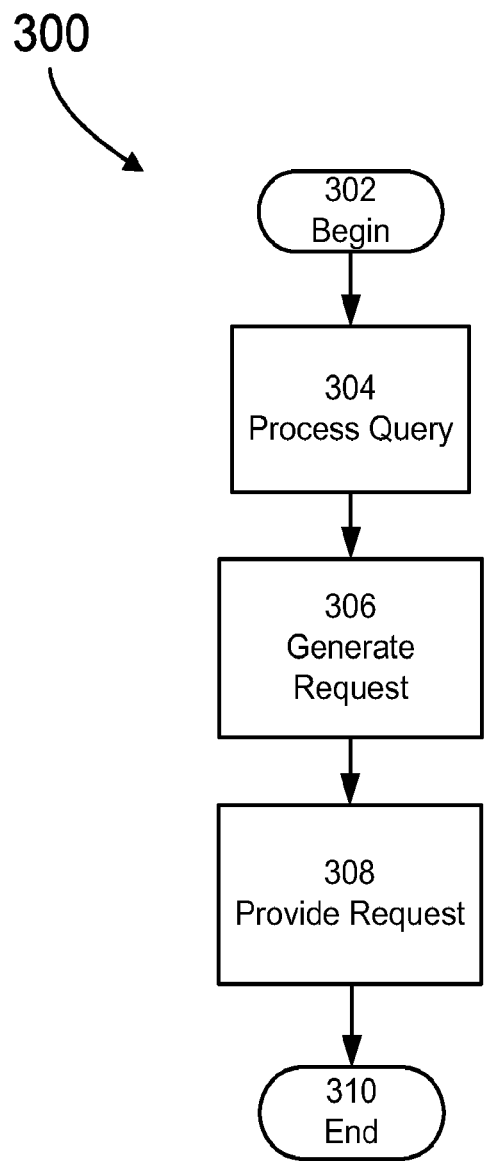
FIG. 3 is a flow diagram of an example query engine process.

1621 Active Energy
1617 Apparent Energy
1625 Reactive Energy
1042 Active Power
1050 Apparent Power
1046 Reactive Power As will be discussed further below in regards to FIGS. 2-4, requests for measurement values which may be unavailable may be satisfied by determining an equivalent measurement type within the same equivalency class. The equivalent measurement type may be chosen based on an equivalency priority and one or more conditions being met. Equivalency priority and conditional equivalence are also discussed further below. It should be understood that the configuration data is not limited to the fields of Tables 1-2 and may include other fields utilized by one or more processes of the present disclosure. For example, as dis-

TABLE 1

| Data Model Identifier | Name | Equivalency Class | Equivalency Priority | Conditions |
|---|---|---|---|---|
| 1621 | Active Energy (kWh) | 1621 Active Energy | 0 | N/A |
| 3400113 | Active Energy Interval (kWh) | 1621 Active Energy | 1 | (1) Consumer can totalize interval values |
| 3400114 | Active Energy Total (kWh) | 1621 Active Energy | 2 | (2) Energy flow is not bi-directional |
| 3400115 | Active Energy Total Interval | 1621 Active Energy | 3 | (1) and (2) Energy flow is not bi-directional |
| 1601 | Active Energy Into the Load (kWh) | 1621 Active Energy | 4 | (2) Energy flow is not bi-directional |
| 3400041 | Active Energy Into the Load Rate 1 | 1621 Active Energy | 5 | (2) and (3) When no other TOU schedule is configured |
| 3400042 | Active Energy Into the Load Rate 1 Interval | 1621 Active Energy | 6 | (1), (2), and (3) |
| 1629 | Conditional Active Energy Into the Load (kWh) | 1621 Active Energy | 7 | (4) When metered condition is valid |
| 1050 | Apparent Power (kVA) | 1050 Apparent Power | 0 | N/A |
| 1621 | Active Energy (kWh) | 1050 Apparent Power | 1 | (5) System has high power factor (>98%) |

Returning to FIG. 1, components 106-112 may use configuration data, such as the data in Table 1, to determine one or more measurement equivalency relationships. According to one embodiment, the user 102 may define the measurement equivalency relationships in the configuration data. The user 102 may define the measurement equivalency relationships using one or more data models to define measurement types. For example, referring to Table 1, the Data Model ID may represent a value which indexes one or more measurement types (e.g., Active Energy, Active Energy Total, etc) for a particular device. It should be understood that the measurement types listed in Table 1 are cussed further below with reference to FIG. 4, a field may also be included indentifying an equivalency validation component, such as the equivalency validation module 112. The equivalency validation component may then be loaded at, or during, runtime to logically determine if the condition has been met (i.e., the equivalent measurement type is a valid substitution). If the condition has not been met, then another equivalent measurement type may be selected, based on the equivalency priority and an additional equivalency validation component may be utilized.

In one embodiment, the query interface 106 uses the configuration data to provide feedback to a user, or a process communicating with the query interface 106 via the API. For example, the configuration data may be examined responsive to the query engine 108 indicating that no equivalent measurement value is available for a requested measurement type. In this example, the query engine 108 may examine configuration data, and provide data to the query interface 106, which suggests another measurement type (or class) which may have a similar measurement value to that of the requested measurement value. In one embodiment, the query engine 108 may determine if a potential measurement type has representative values before suggesting the potential measurement type as an alternative to the user/API. In still other embodiments, the query engine 108 may suggest to the user/API that a particular device should be removed from the query if the device does not have an equivalent measurement.

Measurement Equivalency Processes

As described above with reference to FIG. 1, several embodiments perform processes that determine measurement value equivalency for measurement values from devices with divergent measurement types. In some embodiments, these measurement equivalency processes are executed by the measurement equivalency system, such as the measurement equivalency system 100 described above with reference to FIG. 1. One example of such a measurement equivalency process is illustrated in FIG. 2. According to this example, the measurement equivalency process 200 includes the acts of receiving a query, processing one or more generated requests, and providing one or more equivalent measurements. The measurement equivalency process 200 may be executed in accordance with various device/ computer embodiments as disclosed above. For example, the measurement equivalency process 200 may be executed by the computer system 104 described above with reference to FIG. 1. Process 200 beings at 202.

In act 204, a measurement data query is received by the query interface 106 (FIG. 1). The query interface 106 (FIG. 1) provides the query to the query engine 108 (FIG. 1). The query engine 108 (FIG. 1) may then determine if the measurement values within the query are available based on the measurement identifiers, and one or more criterion in the query. If it is determined that one or more requested measurement values are unavailable, the query engine 108 (FIG. 1) may request one or more equivalent measurement values from the equivalency component 110 (FIG. 1). It should be understood that the query engine 108 and/or the equivalency component 110 (FIG. 1) may determine if the requested measurement values are available by accessing the measurement data repository 114 (FIG. 1). For example, the query engine 108 (FIG. 1) may pass the query, or a series of requests, directly to the equivalency component 110 (FIG. 1). In this example, the equivalency component 110 (FIG. 1) may access the measurement data repository 114 (FIG. 1) to determine if the measurement value is available. Further, the equivalency component 110 (FIG. 1) may transparently provide an equivalent measurement value to the query engine 108 (FIG. 1).

In act 206, one or more requests for measurement values are processed by the equivalency component 110 (FIG. 1). The one or more requests for measurement values may include one or more measurement identifiers, and one or more criterion that was included in the query in act 204. The equivalency component 110 (FIG. 1) may determine if the requested measurement values are available based on the one or more measurement identifiers and the one or more criterion. If the equivalency component 110 determines that one or more of the requested measurement values are unavailable, the equivalency component 110 (FIG. 1) may determine equivalent measurement values. In one embodiment, the equivalency component 110 (FIG. 1) determines equivalent measurement values by accessing configuration data, such as the configuration data included in Table 1 described above. In this embodiment, one or more equivalency validation modules, such as the equivalency validation module 112 (FIG. 1), may be utilized to satisfy a condition required to determine equivalent measurements. In another embodiment, the equivalent measurement values may be transformed by the equivalency component 110 (FIG. 1) prior to providing the equivalent measurement values to the query engine 108 (FIG. 1) in act 208.

In act 208, the equivalent measurement values are provided to the query engine 108 (FIG. 1). In one embodiment, the query engine 108 (FIG. 1) generates a response to the query received in act 204 including the equivalent measurement values. As discussed above with reference to FIG. 1, the response may be used by a user/process to adjust subsequent queries. For example, in one embodiment the response includes include configuration data and at least a portion of the query received in act 204. In this embodiment, a user interface may examine the configuration data to suggest changes to the query (e.g., removing a device or selecting a different equivalency class). In act 210 the process 200 ends.

Processes in accord with the measurement equivalency process 200 enable a user or process to determine if one or more requested measurement values are available based on measurement identifiers and criterion. According to these processes, equivalent measurement values may be validated, transformed, and substituted for the requested measurement values.

As described above with reference to the act 204, some embodiments perform processes through which a query interface 106 (FIG. 1) and a query engine 108 (FIG. 1) receive and process a query for measurement values. One example of how the query interface 106 (FIG. 1) and the query engine 108 (FIG. 2) receive and process a query is illustrated in FIG. 3. According to this example, the process 300 includes acts of processing the query, generating one or more requests, and providing the one or more requests to the equivalency component 110 (FIG. 1). Process 300 begins at act 302.

In act 304 the query interface 106 (FIG. 1) receives the query from the user 102 (FIG. 1) or a process running on computer system 104 of FIG. 1. In one embodiment, the query may include a request for one or more measurement values based on one or more measurement identifiers, and one or more criterion. In one example, the criterion may include one or more device identifiers, one or more physical sensor identifiers, one or more logical device identifiers, one or more data model identifiers, and one or more time-spans. As discussed above with reference to FIG. 1, the query may include logical operators. In at least one embodiment, the logical operators are used to define the scope and parameters of the query. For instance, the logical operators may comprise a hierarchal relationship between one or more conditions (based on the logical operators) which defines the criterion of the query. In this example, a query may include a request for a particular measurement value for device identifiers 1, 2, and 3 between a first time span and a second time span (using a logical AND). In another example, the query include a combination of logical operators to retrieve measurement values for a particular device of a first measurement class, or a second measurement class, depending on measurement value availability.

In at least one embodiment, the query engine 108 (FIG. 1) may examine the measurement data repository 114 to determine if measurement values are available which meet the requested measurement identifier and criterion. If one or more of the device identifiers specified in the query do not have values available in the measurement data repository 114 (FIG. 1), then the query engine 108 (FIG. 1) may generate a request for an equivalent measurement value.

In act 306, one or more requests are generated for equivalent measurement values. The request may include the requested measurement type, the device identifier, and the criterion in the query received in act 304. In one embodiment, the request includes a reference or copy to the configuration data, such as the configuration data discussed above with reference to FIG. 1. In this embodiment, the configuration data includes equivalency relationship information, such as the equivalency information discussed above with reference to Tables 1-2.

In act 308, the one or more generated requests for equivalent measurement values are provided to the equivalency component 110 (FIG. 1). In act 310 process 300 ends.

Processes in accord with the measurement equivalency process 300 enable the query engine 108 to determine if one or more requested measurement identifiers are represented by measurement values in the measurement data repository 114 (FIG. 1). If the query engine 108 (FIG. 1) determines that measurement types are unavailable for a given device (e.g., based on the device identifier, or other criterion included in a query) a request for an equivalent measurement type may be generated and provided to the equivalency component 110.

Figure 4:
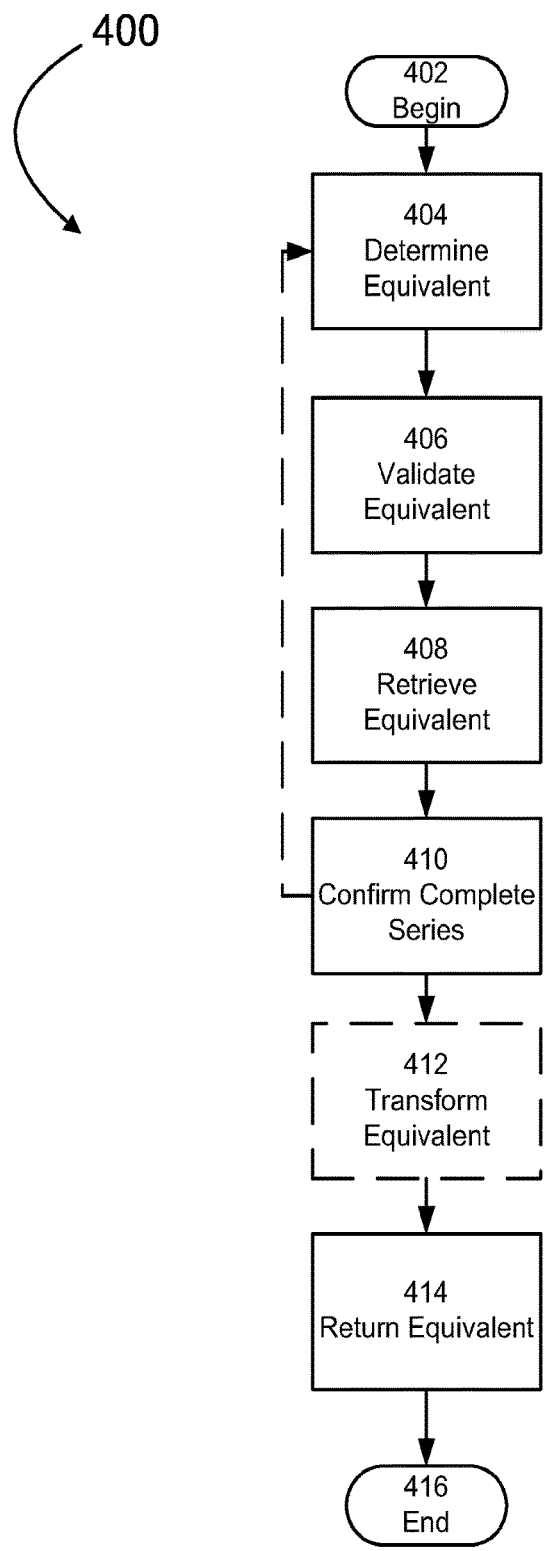
FIG. 4 is a flow diagram of an example measurement equivalency determination process.

As described above with reference to the act 206, some embodiments perform processes through which the equivalency component 110 (FIG. 1) receives and processes requests for one or more measurement values is illustrated in FIG. 4. According to this example, the process 400 includes acts of determining an equivalent measurement type, validating the equivalent measurement type, retrieving measurement values representative of the equivalent measurement type, confirming the retrieved measurement values constitutes a complete series, transforming the retrieved measurement values, and returning the retrieved measurement values.

In act 404, a measurement request is received and a determination is made whether an equivalent measurement type is available. In one embodiment, the measurement request includes a requested measurement type. In this embodiment, the query engine 108 (FIG. 1) has determined that measurement values representative of the requested measurement identifier are unavailable in the measurement data repository 114 (FIG. 1). In other embodiments, the equivalency component 110 may determine that measurement values representative of the requested measurement identifier are unavailable (e.g., via calls by the query engine 108). In these embodiments, the configuration data discussed with regard to FIG. 1 may be used to determine an equivalent measurement type. For instance, if the requested measurement type is 1601 Active Energy into the Load (kWh) (Table 1) than the equivalency component 110 may determine an equivalent measurement type based on the requested measurement equivalency class (i.e., equivalency class 1621 Active Energy). In this instance, the equivalency class may include one or more measurement types which may be substituted for the requested measurement type. In one embodiment, the substitution of one measurement type for another may be based on an equivalency priority, such as the equivalency priority discussed above with reference to FIG. 1. In this embodiment, an equivalent measurement type is selected based on the highest priority in the list. Returning to the example of 1601 Active Energy Into the Load (kWh), the next highest priority equivalent measurement type may be 1621 Active Energy (kWh), as indicated in Table 1 discussed above.

In at least one embodiment, the equivalency component 110 determines an adaptive equivalency priority for equivalency measurements. For instance, if the requested measurement type is 1601 Active Energy Into the Load (kWh), a priority list may be adapted based on this requested measurement. In one embodiment, the adapted list may reorder the equivalency priorities of Table 1 to identify equivalent measurements which are in closest proximity to the requested measurement type (e.g., 3400115 Active Energy Total Interval) may be given an equivalency priority of 0). In another embodiment, a module may be loaded by the equivalency component 116 (FIG. 1) to determine the ordering of equivalency priorities. In yet another embodiment, one or more associated tables may define equivalency priorities based on the requested measurement type.

In act 406, a selected equivalent measurement may be validated based on one or more conditions. In one embodiment, one or more equivalency validation modules, such as equivalency validation module 112 of FIG. 1, are loaded by the equivalency component 110. In this embodiment, the one or more equivalency validation modules provide an extensible way to validate a measurement type based one or more conditions. For example, if a selected equivalent measurement type is 1601 Active Energy into the Load (kWh), then the condition that must be met is the "Consumer (e.g., the device) can totalize interval measurement values", as shown in Table 1 discussed above. In another example, conditions may be used in combination with logical operators similar to the logical operators discussed above with reference to FIG. 1. Referring to Table 1, one such example can be found for the measurement type 3400115 Active Energy Total Interval which includes conditions (1) and (2) being satisfied. It should be understood that one or more logical operators may be utilized to determine if an equivalent measurement type is valid.

In at least one embodiment, the equivalency component 110 may load a specific equivalency validation module, such as equivalency validation module 112 (FIG. 1) to determine if the condition has been met. This may be accomplished by the specific equivalency validation module analyzing the underlying data model, values within the measurement data repository 114 (FIG. 1), or additional configuration data located on the computer system 104 (FIG. 1). In another embodiment, no conditions are required for a measurement type to be a valid equivalency.

In act 408, measurement values corresponding to an equivalent measurement type may be retrieved corresponding to one or more measurement identifiers and criterion received in act 404. In one embodiment, the criterion includes a time-span. It should be understood that the time-span may be represented by a timestamp, an offset, or any object/value capable of defining a time period. In this embodiment, a series of measurement values may be retrieved for the equivalent measurement type. In another embodiment, the criterion may include an identifier of one or more devices. In this embodiment, the equivalency component 110 may perform retrieval of measurement values for each device included in the criterion. It should be understood that any combination of criterion may be used to retrieve data for an equivalent type and is not limited to a single criterion. For example, criterion may include one or more device identifiers, one or more physical sensor identifiers, one or more logical device identifiers, one or more data model identifiers, and one or more time spans.

In act 410, the equivalency component 110 (FIG. 1) determines if the retrieval of measurement values in act 408 is a complete series based on the criterion. For instance, over a given time-span one or more SCADA points may be unavailable. In this instance, it may be necessary to determine one or more equivalent measurements to complete the entire series of points over the requested time-span. In this embodiment, the process repeats acts 404-410 until an entire series has been retrieved, or no available measurement values were located to complete the series. It should be understood that process 300 (FIG. 3) may perform similar acts when retrieving an available requested measurement type. For example, if the process 300 retrieves an incomplete series of SCADA points, the query engine 108 (FIG. 1) may request equivalent measurement values from the equivalency component 110 (FIG. 1).

In act 412, the retrieved equivalent measurement values may be transformed based on criterion or data within the configuration data, such as the configuration data as discussed with reference to FIG. 1. For instance, if the equivalent measurement type is in the unit of energy kWh and the requested measurement type received by the query engine 108 (FIG. 1) is in quantity MWh, a scaling factor may be applied. In one embodiment, the scaling factor may be determined from the configuration data, such as the configuration data discussed with reference to FIG. 1. In another embodiment, a module may be loaded by the equivalency component 110 (FIG. 1) which performs the transformation. It should be understood that act 412 may be optional in process 400 and un-modified equivalent data may be provided.

In act 414, the retrieved equivalent measurement values may be returned to the query engine 108 and later propagated to a user or process through the query interface 106 (FIG. 1). In act 416, process 400 ends.

Programmable Device

As discussed above with regard to FIG. 1, various aspects and functions described herein may be implemented as specialized hardware or software components executing in one or more programmable devices. These programmable devices are configured to independently (i.e., without instructions from a centralized control system) perform one or more specialized automated functions on a periodic basis. Programmable devices have a wide range of potential applications. The characteristics of particular types of programmable devices vary depending on the function that the programmable device is configured to perform. For instance, programmable devices configured for external use may include a rigid and insulated housing, while programmable devices configured to monitor environmental conditions may include one or more sensors configured to measure these environmental conditions. Some specific examples of programmable devices include uninterruptible power supplies, power and resource monitoring devices, protection relays, programmable logic controllers, and utility meters, such as a utility meter 500 as illustrated in FIG. 5.

Figure 5:
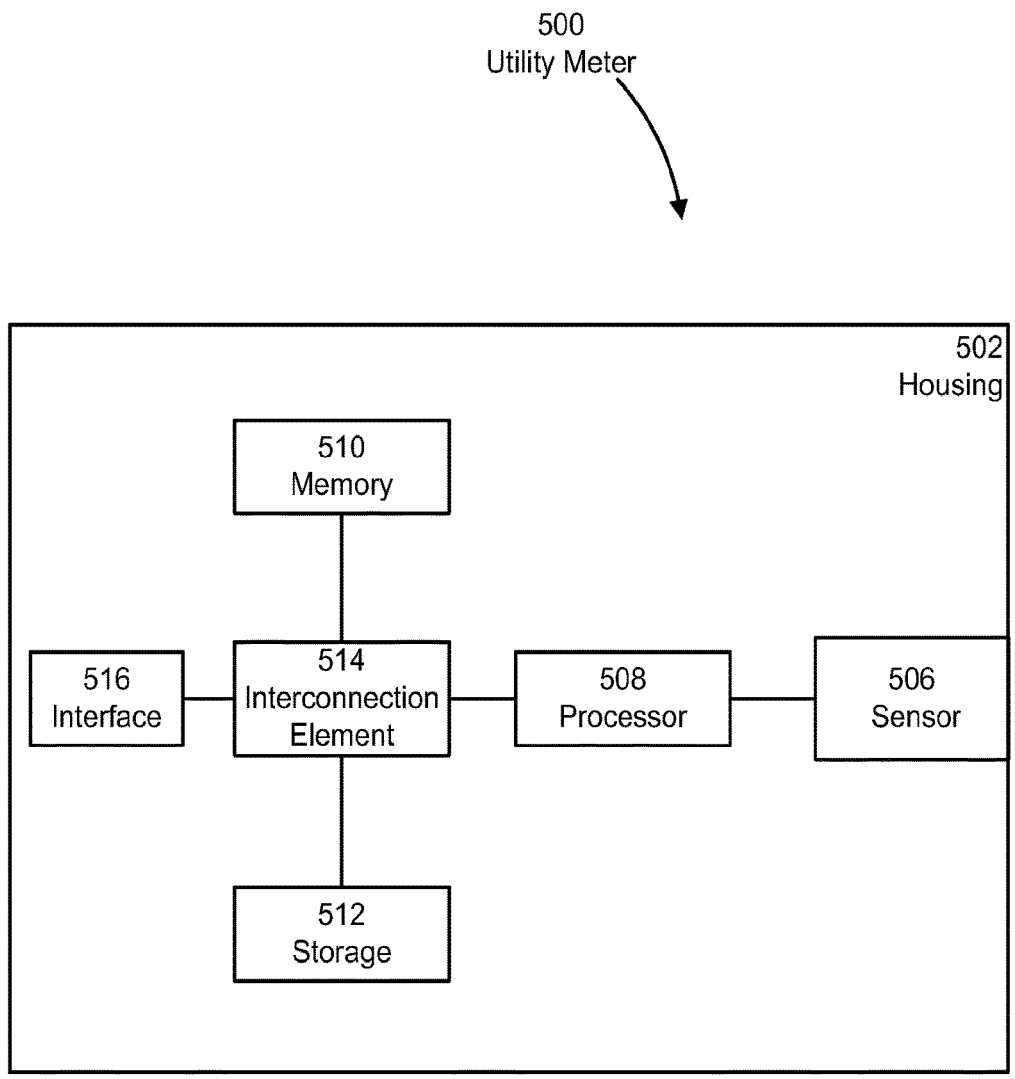
FIG. 5 is a block diagram of an example programmable device that executes processes and functions disclosed herein.

As shown in FIG. 5, the utility meter 500 comprises a housing 502 that includes, a sensor 506, a processor 508, a memory 510, a data storage device 512, an interconnection element 514, and an interface 516. To implement at least some of the aspects, functions, and processes disclosed herein, the processor 508 performs a series of instructions that result in manipulated data. The processor 508 may be any type of processor, multiprocessor, or controller.

The memory 510 stores programs and data during operation of the utility meter 500. Thus, the memory 510 include any device for storing data, such as a disk drive or other non-volatile storage device, but typically includes a relatively high performance, volatile, random access memory such as a dynamic random access memory (DRAM) or static memory (SRAM). Various embodiments may organize the memory 510 into particularized and, in some cases, unique structures to perform the functions disclosed herein. These data structures may be sized and organized to store values for particular data and types of data.

As shown in FIG. 5, several of the components of the utility meter 500 are coupled to the interconnection element 514. The interconnection element 514 may include any communication coupling between components of the utility meter, such as one or more physical busses subscribing to one or more specialized or standard computing bus technologies such as IDE, SCSI, and PCI. The interconnection element 514 enables communications, such as data and instructions, to be exchanged between components of the utility meter 500.

The utility meter 500 also includes one or more interface devices 516 such as input devices, output devices and combination input/output devices. Interface devices may receive input or provide output. More particularly, output devices may render information for external presentation. Input devices may accept information from external sources. Examples of interface devices include buttons, keyboards, touch screens, network interface cards, and the like. Interface devices allow the utility meter 500 to exchange information with and to communicate with external entities, such as users and other systems.

The data storage device 512 includes a computer readable and writeable nonvolatile, or non-transitory, data storage medium in which instructions are stored that define a program or other object that is executed by the processor 508. The data storage 512 also may include information that is recorded, on or in, the medium, and that is processed by the processor 508 during execution of the program. More specifically, the information may be stored in one or more data structures specifically configured to conserve storage space or increase data exchange performance. The instructions may be persistently stored as encoded signals, and the instructions may cause the processor 508 to perform any of the functions described herein. The medium may, for example, be optical disk, magnetic disk or flash memory, among others.

As shown in FIG. 5, the sensor 506 is coupled to the processor 508. The sensor 506 includes an analog sensor and analog to digital converter to provide the processor 508 with a digital signal that represents a quantity of flow (e.g. usage) of a utility as detected by the analog sensor. The particular configuration of the sensor 506 varies depending on the utility being measured by the utility meter 500. For example, in an embodiment including a meter that measures electricity, the sensor 506 includes inputs for single phase or three phase power and records periodic measurements of one or more identified characteristics (e.g., power, voltage, current, etc.) of the electric circuit via the inputs. Upon receipt of these periodic measurements, the processor 508 stores information descriptive of the measurements and the times that the measurements were taken in the data storage element 512. Further, in some embodiments, the processor 508 subsequently transmits the stored information descriptive of the measurements to an external entity via a network interface included in the interface devices 516.

Some embodiments of the utility meter 500 include operational parameters that may be configured via protected functionality provided by the utility meter 500. These operational parameters may be used to configure CT/PT ratio, system type, demand calculations, I/O setup, onboard data logging, onboard waveform capture, and onboard alarming.

Although the utility meter 500 is shown by way of example as one type of utility meter upon which various aspects and functions may be practiced, aspects and functions are not limited to being implemented on the utility meter 500 as shown in FIG. 5. Various aspects and functions may be practiced on one or more utility meters having a different architectures or components than that shown in FIG. 5. For instance, the utility meter 500 may include specially programmed, special-purpose hardware, such as an application-specific integrated circuit (ASIC) tailored to perform one or more particular operations disclosed herein.

In some examples, the components of the utility meter 500 disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers, and switches. Further, aspects may be located on a single computer system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Figure 6:
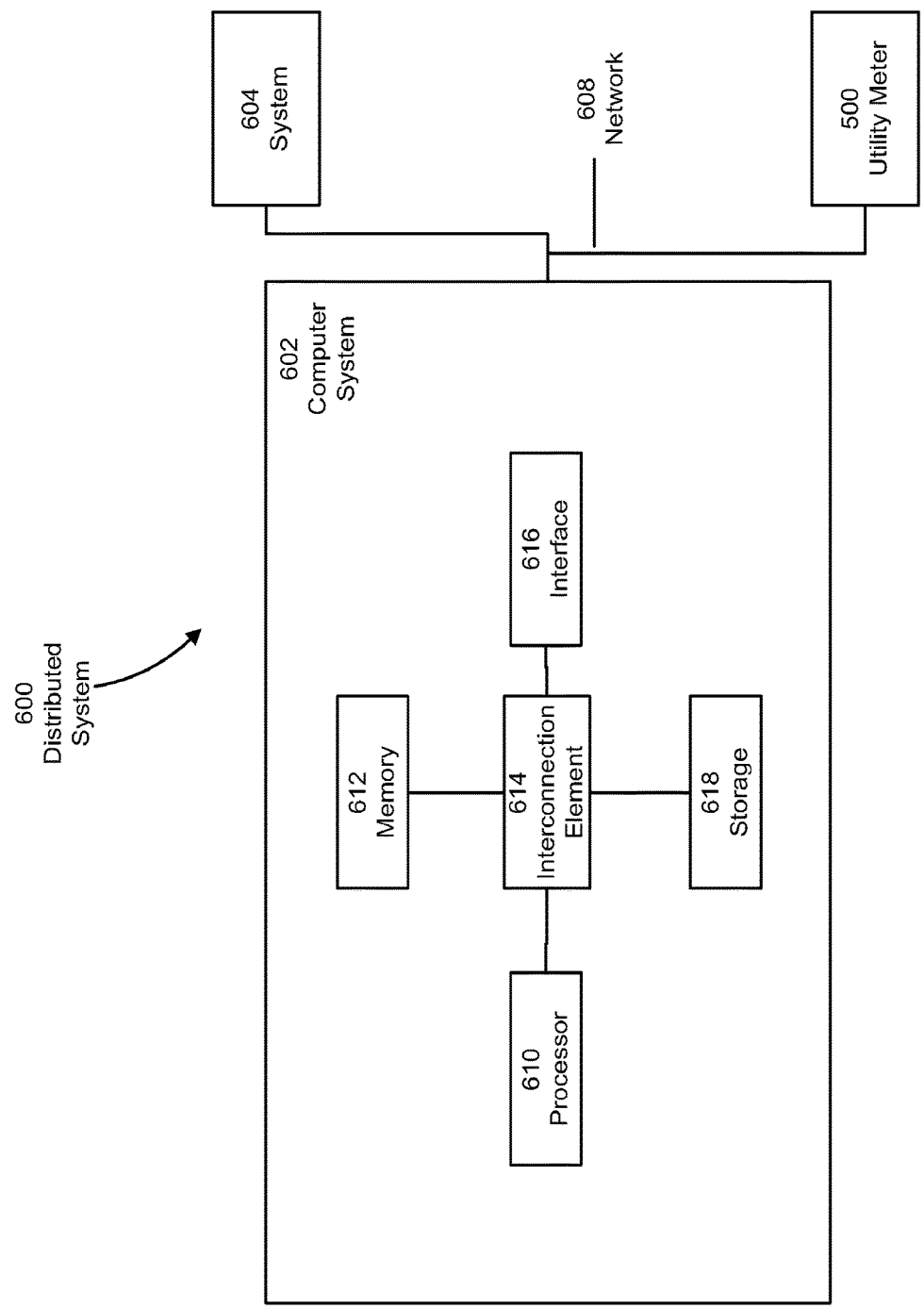
FIG. 6 is a block diagram of an example of a computer system that executes processes and functions disclosed herein.

Referring to FIG. 6, there is illustrated a block diagram of a distributed computer system 600, in which various aspects and functions are practiced. As shown, the distributed computer system 600 includes one more computer systems that exchange information. More specifically, the distributed computer system 600 includes computer systems 602 and 604 and utility meter 500. As shown, the computer systems 602 and 604 and utility meter 500 are interconnected by, and may exchange data through, a communication network 608. The network 608 may include any communication network through which computer systems may exchange data. To exchange data using the network 608, the computer systems 602 and 604 and utility meter 500 and the network 608 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 602 and 604 and utility meter 500 may transmit data via the network 608 using a variety of security measures including, for example, TLS, SSL, or VPN. While the distributed computer system 600 illustrates three networked computer systems, the distributed computer system 600 is not so limited and may include any number of computer systems and computing devices, networked using any medium and communication protocol.

As illustrated in FIG. 6, the computer system 602 includes a processor 610, a memory 612, an interconnection element 614, an interface 616 and data storage element 618. To implement at least some of the aspects, functions, and processes disclosed herein, the processor 610 performs a series of instructions that result in manipulated data. The processor 610 may be any type of processor, multiprocessor or controller. Some exemplary processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. The processor 610 is connected to other system components, including one or more memory devices 612, by the interconnection element 614.

The memory 612 stores programs and data during operation of the computer system 602. Thus, the memory 612 may be a relatively high performance, volatile, random access memory such as a dynamic random access memory ("DRAM") or static memory ("SRAM"). However, the memory 612 may include any device for storing data, such as a disk drive or other nonvolatile storage device. Various examples may organize the memory 612 into particularized and, in some cases, unique structures to perform the functions disclosed herein. These data structures may be sized and organized to store values for particular data and types of data.

Components of the computer system 602 are coupled by an interconnection element such as the interconnection element 614. The interconnection element 614 may include any communication coupling between system components such as one or more physical busses in conformance with specialized or standard computing bus technologies such as IDE, SCSI, PCI and InfiniBand. The interconnection element 614 enables communications, such as data and instructions, to be exchanged between system components of the computer system 602.

The computer system 602 also includes one or more interface devices 616 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 602 to exchange information and to communicate with external entities, such as users and other systems.

The data storage element 618 includes a computer readable and writeable nonvolatile, or non-transitory, data storage medium in which instructions are stored that define a program or other object that is executed by the processor 610. The data storage element 618 also may include information that is recorded, on or in, the medium, and that is processed by the processor 610 during execution of the program. More specifically, the information may be stored in one or more data structures specifically configured to conserve storage space or increase data exchange performance. The instructions may be persistently stored as encoded signals, and the instructions may cause the processor 610 to perform any of the functions described herein. The medium may, for example, be optical disk, magnetic disk or flash memory, among others. In operation, the processor 610 or some other controller causes data to be read from the nonvolatile recording medium into another memory, such as the memory 612, that allows for faster access to the information by the processor 610 than does the storage medium included in the data storage element 618. The memory may be located in the data storage element 618 or in the memory 612, however, the processor 610 manipulates the data within the memory, and then copies the data to the storage medium associated with the data storage element 618 after processing is completed. A variety of components may manage data movement between the storage medium and other memory elements and examples are not limited to particular data management components. Further, examples are not limited to a particular memory system or data storage system.

Although the computer system 602 is shown by way of example as one type of computer system upon which various aspects and functions may be practiced, aspects and functions are not limited to being implemented on the computer system 602 as shown in FIG. 6. Various aspects and functions may be practiced on one or more computers having a different architectures or components than that shown in FIG. 6. For instance, the computer system 602 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 602 may be a computer system including an operating system that manages at least a portion of the hardware elements included in the computer system 602. In some examples, a processor or controller, such as the processor 610, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 610 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system configured to provide equivalent measurement values comprising:
    at least one device having a sensor configured to measure at least one parameter and provide a measured value related to the at least one parameter; and
    a processing system operatively coupled to the at least one device to receive the measured value, the processing system including:
        at least one memory configured to receive the measured value and store at least one stored measurement value based on the measured value;
        at least one processor coupled to the at least one memory;

a query engine executable by the at least one processor and configured to receive a measurement data query; and a measurement equivalency component executable by the at least one processor and configured to:
receive, from the query engine, data requesting at least one measurement value meeting at least one criterion, the at least one measurement value having at least one first measurement type;
determine that the at least one measurement value is not stored within the at least one memory;
determine that the at least one stored measurement value meets the at least one criterion and has at least one second measurement type different from the at least one first measurement type; and
provide data descriptive of at least one equivalent measurement value based on the at least one stored measurement value to the component in response to receipt of the data requesting the at least one measurement value.

2. The system of claim 1, wherein the measurement equivalency component is configured to receive the data by receiving data requesting at least one measurement value from an identified device recorded within an identified period of time.

3. The system of claim 2, wherein the at least one measurement value includes a plurality of measurement values and the measurement equivalency component is configured to:
determine that the at least one measurement value is not stored within the at least one memory by determining that one or more measurement values of the plurality of measurement values are not stored within the at least one memory;
determine that one or more other measurement values of the plurality of measurement values are stored within the at least one memory;
determine that the at least one stored measurement value meeting the at least one criterion and having the at least one second measurement type different from the at least one measurement type is stored within the at least one memory by identifying one or more stored measurement values meeting the at least one criterion, having the at least one second measurement type, and corresponding to the one or more measurement values, and
providing data describing the at least one equivalent measurement value by providing the one or more stored measurement values and the one or more other measurement values.

4. The system of claim 1, wherein the measurement equivalency component is configured to determine that the at least one stored measurement value meeting the at least one criterion and having the at least one second measurement type different from the at least one first measurement type is stored within the at least one memory by identifying at least one measurement class including the at least one first measurement type and identifying the at least one second measurement type as belonging to the at least one measurement class.

5. The system of claim 4, wherein the measurement equivalency component is further configured to determine that the at least one stored measurement value meeting the at least one criterion and having the at least one second measurement type different from the at least one first measurement type is stored within the at least one memory by determining that the at least one second measurement type has a priority higher than a priority of at least one third measurement type belonging to the at least one measurement class.

6. The system of claim 4, wherein the measurement equivalency component is further configured to determine that the at least one stored measurement value meeting the at least one criterion and having the at least one second measurement type different from the at least one first measurement type is stored within the at least one memory by identifying at least one equivalency validation component configured to determine whether a predefined condition exists; and executing the at least one equivalency validation component.

7. The system of claim 1, wherein the measurement equivalency component is configured to provide the data describing the at least one equivalent measurement value by identifying at least one equivalency calculation component configured to calculate the at least one equivalent measurement value and executing the at least one equivalency calculation component.

8. A method of providing equivalent measurement values in a system having at least one device configured to measure at least one parameter and having a computer system, coupled to the at least one device, and including at least one memory and at least one processor coupled to the at least one memory, the method comprising:
receiving by the computer system from the at least one device a measured value related to the at least one parameter;
storing at least one measurement value based on the measured value in the memory;
receiving, from a query engine executed by the at least one processor, data requesting at least one measurement value meeting at least one criterion, the at least one measurement value having at least one first measurement type;
determining that the at least one measurement value is not stored within the at least one memory;
determining that at least one stored measurement value meeting the at least one criterion and having at least one second measurement type different from the at least one first measurement type is stored within the at least one memory; and
providing data describing at least one equivalent measurement value based on the at least one stored measurement value to the component in response to receiving the data requesting the at least one measurement value.

9. The method of claim 8, wherein receiving the data includes receiving data requesting at least one measurement value from an identified device recorded within an identified period of time.

10. The method of claim 9, wherein the at least one measurement value includes a plurality of measurement values,
determining that the at least one measurement value is not stored within the at least one memory includes determining that one or more measurement values of the plurality of measurement values are not stored within the at least one memory,
determining that one or more other measurement values of the plurality of measurement values are stored within the at least one memory,
determining that the at least one stored measurement value meeting the at least one criterion and having the at least one second measurement type different from the at least one measurement type is stored within the at least one memory includes identifying one or more stored measurement values meeting the at least one criterion, having the at least one second measurement type, and corresponding to the one or more measurement values, and providing data describing the at least one equivalent measurement value includes providing the one or more stored measurement values and the one or more other measurement values.

11. The method of claim 8, wherein determining that the at least one stored measurement value meeting the at least one criterion and having the at least one second measurement type different from the at least one first measurement type is stored within the at least one memory includes:

identifying at least one measurement class including the at least one first measurement type; and identifying the at least one second measurement type as belonging to the at least one measurement class.

12. The method of claim 11, wherein determining that the at least one stored measurement value meeting the at least one criterion and having the at least one second measurement type different from the at least one first measurement type is stored within the at least one memory further includes determining that the at least one second measurement type has a priority higher than a priority of at least one third measurement type belonging to the at least one measurement class.

13. The method of claim 11, wherein determining that the at least one stored measurement value meeting the at least one criterion and having the at least one second measurement type different from the at least one first measurement type is stored within the at least one memory further includes:

identifying at least one equivalency validation component configured to determine whether a predefined condition exists; and executing the at least one equivalency validation component.

14. The method of claim 8, wherein providing the data describing the at least one equivalent measurement value includes:

identifying at least one equivalency calculation component configured to calculate the at least one equivalent measurement value; and executing the at least one equivalency calculation component.

15. A non-transitory computer readable medium storing sequences of instructions executable by at least one processor, the sequences of instructions instructing the at least one processor to execute a process of providing equivalent measurement values, the sequences of instructions including instructions configured to:

receive from at least one device a measured value related to at least one parameter;

store at least one stored measurement value based on the measured value;

receive, from a query engine executed by the at least one processor, data requesting at least one measurement value meeting at least one criterion, the at least one measurement value having at least one first measurement type;

determine that the at least one measurement value is not stored within the at least one memory;

determine that the at least one stored measurement value meets the at least one criterion and has at least one second measurement type different from the at least one first measurement type; and provide data descriptive of at least one equivalent measurement value based on the at least one stored measurement value to the component in response to receipt of the data requesting the at least one measurement value.

16. The computer readable medium of claim 15, wherein the instructions are configured to receive the data by receiving data requesting at least one measurement value from an identified device recorded within an identified period of time.

17. The computer readable medium of claim 16, wherein the at least one measurement value includes a plurality of measurement values and the instructions are configured to:

determine that the at least one measurement value is not stored within the at least one memory by determining that one or more measurement values of the plurality of measurement values are not stored within the at least one memory;

determine that one or more other measurement values of the plurality of measurement values are stored within the at least one memory;

determine that the at least one stored measurement value meeting the at least one criterion and having the at least one second measurement type different from the at least one measurement type is stored within the at least one memory by identifying one or more stored measurement values meeting the at least one criterion, having the at least one second measurement type, and corresponding to the one or more measurement values, and providing data describing the at least one equivalent measurement value by providing the one or more stored measurement values and the one or more other measurement values.

18. The computer readable medium of claim 15, wherein the instructions are configured to determine that the at least one stored measurement value meeting the at least one criterion and having the at least one second measurement type different from the at least one first measurement type is stored within the at least one memory by identifying at least one measurement class including the at least one first measurement type and identifying the at least one second measurement type as belonging to the at least one measurement class.

19. The computer readable medium of claim 18, wherein the instructions are further configured to determine that the at least one stored measurement value meeting the at least one criterion and having the at least one second measurement type different from the at least one first measurement type is stored within the at least one memory by determining that the at least one second measurement type has a priority higher than a priority of at least one third measurement type belonging to the at least one measurement class.

20. The computer readable medium of claim 18, wherein the instructions are further configured to determine that the at least one stored measurement value meeting the at least one criterion and having the at least one second measurement type different from the at least one first measurement type is stored within the at least one memory by identifying at least one equivalency validation component configured to determine whether a predefined condition exists; and executing the at least one equivalency validation component.

* * * * *